B. K. WILBUR.
DEVICE FOR FILLING CARTONS OR BOXES.
APPLICATION FILED DEC. 11, 1920.
1,415,075. Patented May 9, 1922.
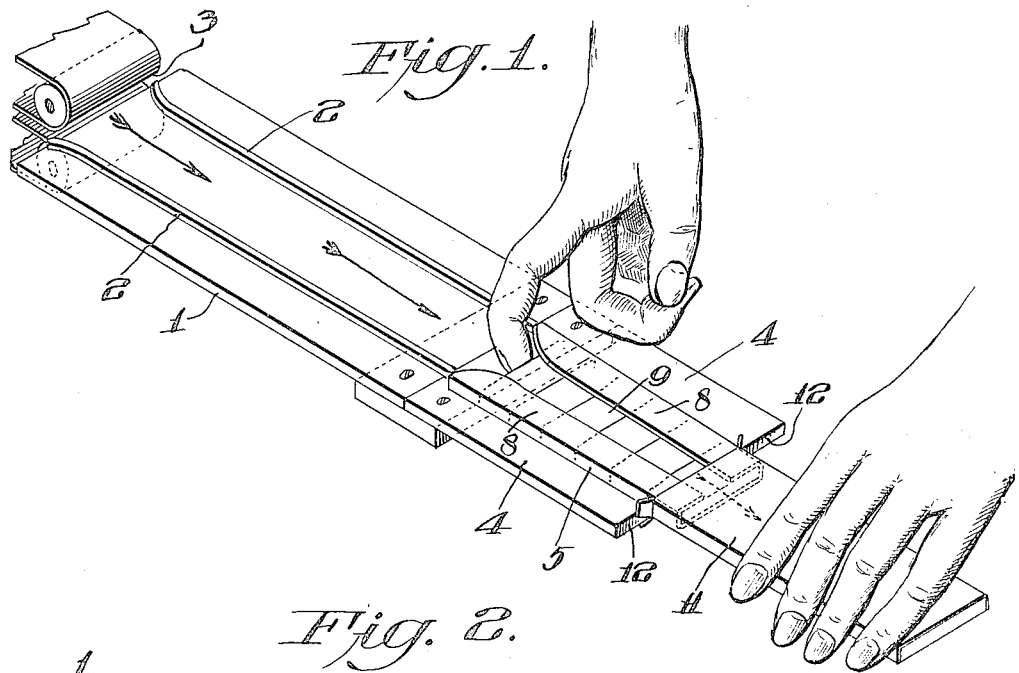
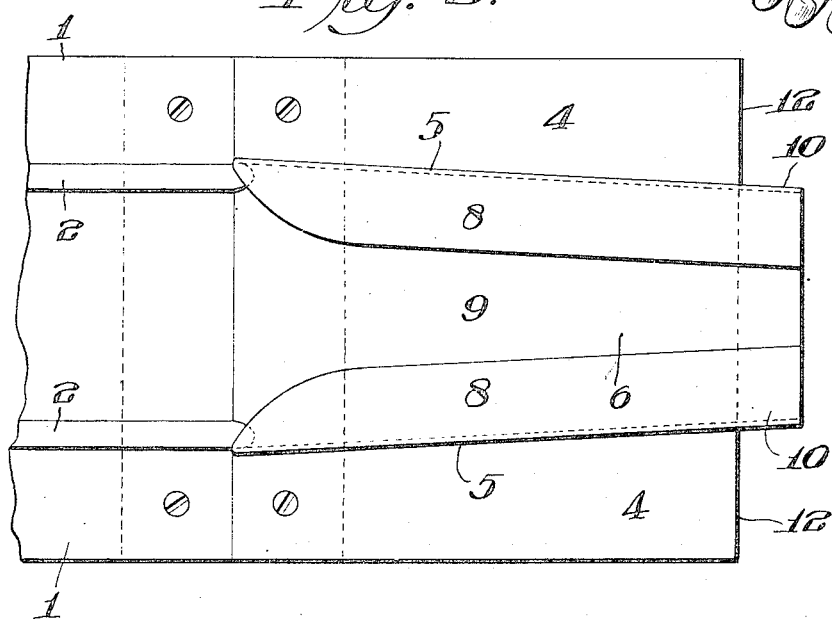
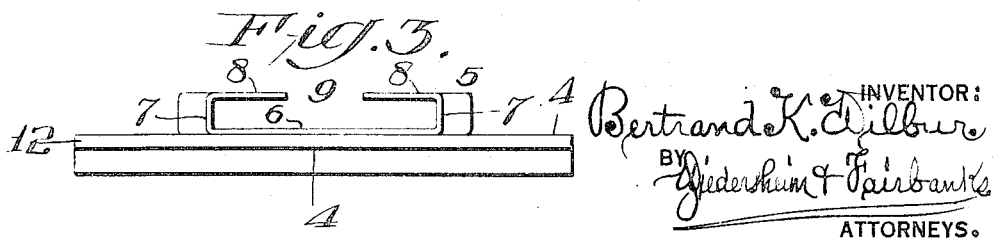

UNITED STATES PATENT OFFICE.

BERTRAND K. WILBUR, OF HAVERFORD, PENNSYLVANIA, ASSIGNOR TO H. O. WILBUR & SONS, INC., OF PHILADELPHIA, PENNSYLVANIA, A CORPORATION OF PENNSYLVANIA.

DEVICE FOR FILLING CARTONS OR BOXES.

1,415,075.        Specification of Letters Patent.        Patented May 9, 1922.

Application filed December 11, 1920. Serial No. 429,863.

*To all whom it may concern:*

Be it known that I, BERTRAND K. WILBUR, a citizen of the United States, residing at Haverford, in the county of Montgomery, State of Pennsylvania, have invented a new and useful Device for Filling Cartons or Boxes, of which the following is a specification.

My invention consists of a device for filling a receptacle such as a carton or box with articles in succession in a convenient, easy, rapid and uniform manner, the same involving a chute of novel form into which the articles are fed and which is adapted to receive the finger of an operator by which an established series of the articles may be pushed into a carton or box at one operation, provision being also made to position the carton or box true on the exit terminal of the chute and retain it thereon during the filling operation.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of a device for filling cartons or boxes embodying my invention.

Figure 2 represents a top or plan view thereof on an enlarged scale. Figure 3 represents an end view thereof.

Similar numerals of reference indicate corresponding parts in the figures.

Referring to the drawings.

1 designates a table on whose upper face are the laterally spaced-apart bars 2 which rise therefrom and extend in the longitudinal direction of the table forming guides for articles fed to the table 1 from a suitable supplying device 3, and movable on said table in the direction of the arrows. 4 is a plate or board for supporting the chute 5, said plate being an extension of the table 1 and secured firmly thereto in any suitable manner. The supply device 3 consists of endless aprons which are passed around rollers at the opposite ends of said aprons, said aprons being separated sufficiently to form a passage between them, said passage being adapted at one end to receive said article and discharge it at the other end upon the table 1, said passage being in the line of the top of the table hence the articles placed on the top of the lower roller are fed to the table as above stated. Motion is communicated to said aprons in any suitable manner.

The chute 5 is tubular in its nature being formed of the base 6, the sides 7 and the inturned top pieces or flanges 8 forming the top wall of the chute, said flanges projecting towards each other and being separated forming a longitudinally extending passage 9 for the insertion of a finger of the operator of the device, the chute being so disposed in relation to the bars 2 that the latter serve to guide the articles as aforesaid towards and into the chute 5. The interior of the chute is preferably tapering, its widest end being towards the bars 2 and the head ends of the flanges 8 have their walls flaring outwardly so as to freely admit the finger of the operator to the passage 9 while preventing the finger from being jammed at said head ends and serving to feed the articles from the table straight into the chute.

As the inlet end of the walls of the passage 9 flare outwardly as has been stated, this to a greater extent than the main length of the passage, the finger that is introduced in said end will have ample room in which to work to push the articles through the chute, without injury, and as said walls are rounded, the finger will not be cut by the same. As the inlet end of the passage 9 is at the discharge end of the guides 2, and the endless feed aprons are at the head ends thereof of said guides, the finger of the operator is far removed from said aprons as not to be liable to be caught in any manner by the latter. The terminal of the chute projects somewhat beyond the terminal of the support 4 therefor as at 10 by which provision the open end of a carton or box 11 may be fitted readily on said terminal so as to be in communication with the interior of the chute at the discharge end thereof.

When the carton or box is in said position and it may be held by hand, the articles to be directed into the carton or box are passed successively from the supply device upon the table 1 and moved along on the same until they reach the mouth or head end of the chute when they are guided into the latter and when the proper number of articles to fill the carton or box are in the chute the operator inserts his or her finger into the head of the passage 9 and presses it against the last article therein when he or she pushes the entire number of articles through the chute into the carton or box thus filling the latter. The filled carton or box is then removed from the chute and closed. Another empty carton or box is fitted on the portion 10 of the chute and meanwhile other articles have been advanced on the table and directed successively into the chute so as to fit into the box or carton as before, and so the operations are repeated.

The edge 12 of the outer terminal of the plate 4 forms a shoulder against which the open top of a carton or box when on the extension 10 of the chute 5 is adapted to abut for limiting the placement of the carton or box on said extension 10 and so the cartons or boxes are always properly positioned thereon to the proper extent and straight to receive the proper number of articles therein, and cause a uniform filling of the cartons or boxes while the latter may be held true by the hand during the filling operation.

Having thus described my invention what I claim as new and desire to secure by Letters Patent, is:—

1. In a receptacle filling device, primary supply aprons, a table leading from the latter, longitudinally guiding bars on said table, a channelled chute having a longitudinally extending passage in its upper side, and a support for said chute longitudinally continuous of said table, the entrance end of said passage having its walls flaring outwardly.

2. In a receptacle filling device, primary supply aprons, a table leading from the latter, longitudinally guiding bars on said table, a channelled chute having a longitudinally extending passage in its upper side, and a support for said chute longitudinally continuous of said table, the outlet end of said chute being extended beyond the adjacent terminal of the support of said chute forming a shoulder therewith, and the entrance end of the passage being constructed to guide the finger of the operator into said passage and prevent injury to the finger as it pushes the article beyond said entrance end.

BERTRAND K. WILBUR.

Witnesses:—
 MARY E. BALLANTYNE,
 C. A. BURHANS.